United States Patent [19]
Azorlosa et al.

[11] 3,951,792
[45] Apr. 20, 1976

[54] FLOCCULATION OF SUSPENDED SOLIDS

[75] Inventors: Julian L. Azorlosa, Bakersfield, Calif.; Earl P. Williams, Pen Argyl, Pa.

[73] Assignee: GAF Corporation, New York, N.Y.

[22] Filed: Dec. 18, 1973

[21] Appl. No.: 425,925

Related U.S. Application Data

[60] Division of Ser. No. 239,531, March 30, 1972, Pat. No. 3,835,084, which is a continuation-in-part of Ser. No. 834,797, June 19, 1969, abandoned.

[52] U.S. Cl. ................................... 210/52; 210/54
[51] Int. Cl.² ........................................... C02B 1/20
[58] Field of Search ........................... 210/52–54; 260/29.6 HN, 29.6 NR

[56] References Cited
UNITED STATES PATENTS

| | | | |
|---|---|---|---|
| 3,203,910 | 8/1965 | Wilson | 210/54 X |
| 3,235,490 | 2/1966 | Goren | 210/54 X |
| 3,406,155 | 10/1968 | Azorlosa et al. | 210/54 X |
| 3,412,020 | 11/1968 | Azorlosa | 210/54 |
| 3,475,386 | 10/1969 | Meigs et al. | 210/54 X |

*Primary Examiner*—Thomas G. Wyse
*Attorney, Agent, or Firm*—Walter C. Kehm; Joshua J. Ward

[57] ABSTRACT

Solids dispersed or suspended in aqueous systems are flocculated or precipitated by adding to said system a flocculating amount of a blend, either in dry form or in an aqueous solution, containing a polymeric mixture of from about 2 to about 3 parts by weight of a polyvinyl pyrrolidone, having a K-value of about 80 to 140, and about 1 part by weight of polyethylene imine having a viscosity of about 20 to 5,000 centipoises.

5 Claims, 1 Drawing Figure

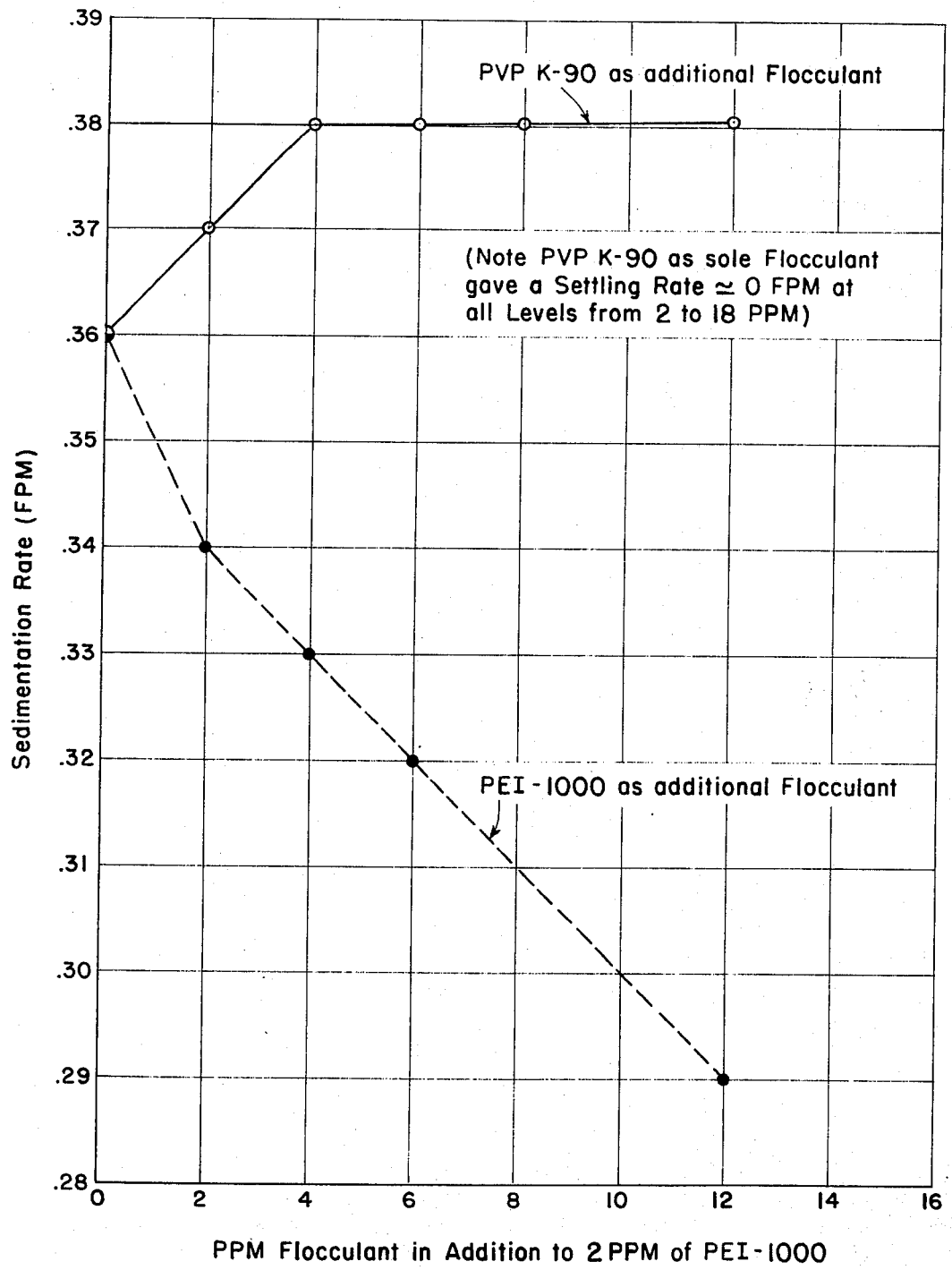

FLOCCULATION OF SUSPENDED SOLIDS

CROSS-REFERENCE TO RELATED APPLICATIONS

The present application is a division of application Ser. No. 239,531 filed Mar. 30, 1972, now U.S. Pat. No. 3,835,084, issued Sept. 10, 1974 and which in turn is a continuation-in-part of application Ser. No. 834,797 filed June 19, 1969, now abandoned.

BACKGROUND OF THE INVENTION

1. Field of the Invention

This invention relates to the precipitation or flocculation of solids dispersed or suspended in an aqueous system. In short, it relates to the flocculation or coagulation of dispersed solids from aqueous colloidal dispersions.

2. Description of the Prior Art

It is known that aqueous solutions of salts of polyethylene imine, such as the hydrochloride, acetate or sulfate, may be employed as precipitating agents of anionic dispersed phases, i.e., bodies dispersed in an aqueous phase which carry an absorbed or relatively immobile anion such as organic anion, fatty acid anion, carboxylic or sulfonic acid anion. As an example of the latter, there may be mentioned a latex containing about 10 percent of a synthetic copolymer of butadiene and styrene dispersed in an aqueous phase by means of pentaerythritol monolaurate. To coagulate or flocculate the said latex, about 2.4 parts by weight of the hydrochloride salt of polyethylene imine in aqueous solution are required per 100 parts by weight of the latex.

From the foregoing amounts utilized in flocculating the latex, it is evident that such flocculation is rather expensive.

It is an object of the invention, therefore, to provide an improved composition and process for the flocculation of solids suspended in aqueous systems.

It is another object of the invention to provide a composition and process for the flocculation of solids suspended in aqueous systems in which the flocculating ability of polyethylene imine is enhanced.

With these and other objects in mind, the invention is hereinafter set forth in detail, the novel features thereof being particularly pointed out in the appended claims.

SUMMARY OF THE INVENTION

The flocculation of solids suspended in an aqueous phase is enhanced by the addition of a flocculation amount of a novel flocculating composition consisting essentially of a blend of from about 2 to about 3 parts by weight of polyvinyl pyrrolidone having a K-value of from about 80 to about 140 and about 1 part by weight of polyethylene imine having a viscosity in 5% aqueous solution at 25°C of from about 20 to about 5,000 centipoises. The blend can be added to the aqueous phase either in dry form or as an aqueous solution.

DETAILED DESCRIPTION OF THE INVENTION

We have found that a blend of from about 2 to about 3 parts by weight of polyvinyl pyrrolidone having a K-value of from about 80 to about 140 and about 1 part by weight of polyethylene imine having a viscosity, measured in a 5% aqueous solution at 25°C, of from about 20 to about 5,000 centipoises displays a synergistic effect when employed as a flocculating agent for solids suspended in an aqueous media.

With reference to the polyvinyl pyrrolidone, the K-value is a parameter denoting the molecular size of the polymer, as disclosed by H. Fikentscher, Celluloschemie 13, 58 (1932). As employed herein and in ordinary commercial practice, the K-value is determined by measuring the viscosity of a 1% solution of the subject polymer in water at 25 ± 0.05°C and computing the relative viscosity thereof, i.e. average flow time of said solution/average flow time of water. The K-value, indicative of the particular polymer being investigated, is computed therefrom in accordance with the formula set forth by Fikentscher.

As with other known flocculating agents, the flocculating ability of polyethylene imines generally increases as the viscosity of the imine product is increased provided water solubility is preserved for effectiveness in an aqueous media. It is within the scope of the present invention, therefore, to employ polyethylene imines having a viscosity even in excess of the upper limit referred to above, the effective limitation in the practice of the invention being the commercial availability of the polyethylene imines of such higher viscosities. A polyethylene imine viscosity within the range of from about 20 to about 2,000 centipoises or cps has been found generally satisfactory, the flocculating ability of the polyethylene imine being enhanced surprisingly by the presence of polyvinyl pyrrolidone in the synergistic flocculating composition of the present invention. Illustrative of the commercially available polyethylene imine products that can be used in the practice of the invention are PEI 600 and PEI 1000, formerly Montrek 600 and Montrek 1000 respectively, both polyethylene imine products of The Dow Chemical Corporation. PEI 600 polyethylene imine, for example, has a Brookfield viscosity, in a 5% by weight aqueous solution at 25°C, of 28 cps. PEI 1000 polyethylene imine product has a viscosity under the indicated conditions of about 1,200 cps. The higher viscosity polyethylene imine will, of course, have a longer polymer chain and higher molecular weight than the relatively less viscous products. With respect to the PEI 600 product referred to above, for example, the number average molecular weight of this product will range from about 40,000 to about 60,000 whereas said number average molecular weight, determined by gel phase chromatography, is in the range of from about 50,000 to about 100,000 for the PEI 1,000 product.

In other words, the use of the recited blend gives superior flocculation to that obtained by the use of polyethylene imine alone. What is surprising is the fact that the polyvinyl pyrrolidone, by itself has no flocculating or precipitating property with respect to suspended or dispersed inorganic or organic materials.

However, when the polyvinyl pyrrolidone is blended with polyethylene imine in the aforestated ratios, the resulting blend displays a definite synergistic effect. Moreover, as will be shown hereinafter with respect to the blends of polyvinyl pyrrolidone and polyethylene imine and the use of polyethylene imine alone, when compared on an equivalent total weight basis, the amount of polyethylene imine in the blend is ⅓ to 1/5 that of the polyethylene imine as the sole flocculant, that is, a given amount of polyethylene imine blended with polyvinyl lactam, which by itself is not a flocculating agent, yields a flocculating or precipitating equivalent or superior to many times that amount of polyethylene imine employed without polyvinyl pyrrolidone.

The polyvinyl pyrrolidone employed in the blend will hereinafter for the sake of brevity be referred to as PVP and the polyethylene imine will hereinafter be referred to for the sake of brevity as PEI. The blend is readily prepared by uniformly mixing aqueous solutions of the polymeric materials at room temperature in the aforestated ratios. For this purpose, aqueous solutions having from about 0.02% to about 5% by weight of the recited blend of PVP and PEI can be prepared, with a blend concentration of about 0.05% by weight being commonly employed, based on the total weight of said aqueous solution. Dried PVP and PEI in the desired ratios may also be blended and used as such as the flocculating agent or dissolved subsequently to give a final solution which may, in turn, be used as the flocculating agent. The amount of the dry blend of PVP and PEI in the aforestated ratios, or the volume of the aqueous solution blend that is employed as the flocculant, may range from 1 to 50 or more parts per million of flocculating agent on the aqueous system containing dispersed materials, whether inorganic or organic, that are to be precipitated or flocculated.

The flocculating agents prepared in accordance with the present invention may be employed in the flocculation or anionic colloidal dispersions in aqueous systems. They are excellent for precipitating anionic dispersed latices natural and synthetic, sewage for separating sewer sludges, for separating sludges from industrial operations, and in its precipitation of colloidal dispersions of all types having an anionic charge. They are of particular interest in many areas of mineral ore recovery.

The following examples will illustrate how the flocculating composition is employed as flocculant of suspended solids. In the following examples and tables, the ratio of PVP to PEI in the blend is given, together with the K-value of the PVP. The polyethylene imines employed in the examples are either Dow PEI 600, formerly Montrek 600, or Dow PEI 1000, formerly Montrek 1000, having the viscosities indicated above and the corresponding molecular weight ranges as also set forth above and as referred to in the following examples.

EXAMPLE I 1 and 5 percent dispersions of 125 mesh amorphous silica were treated with 1, 5 and 10 parts per million of the flocculating composition on the total dispersion. The polyethylene imine (PEI) in the blend had a molecular weight of 40,000 – 60,000. The resultant supernatant liquids were rated optically as follows: clear (5.0), slightly hazy (4.0), hazy (3.0), very hazy or cloudy (2.0), very cloudy (1.0), and no clarification (0.0). To determine a clarification average, the ratings for clarity were totaled for each polymer and divided by the number of trials (six).

Table 1

| Blended Flocculant | Clarification Average |
|---|---|
| 3/1 PVP K-90/PEI | 4.00 |
| 2/1 PVP K-130/PEI | 3.83 |
| 3/1 PVP K-130/PEI | 3.83 |
| 4/1 PVP K-130/PEI | 3.67 |
| 4/1 PVP K-90/PEI | 3.67 |
| PEI alone | 3.67 |
| 2/1 PVP K-90/PEI | 3.50 |

Table 1-continued

| Blended Flocculant | Clarification Average |
|---|---|
| PVP alone | 0.0 |

The data in Table 1 show that certain blends of PVP/PEI give superior clarification to that obtained with PEI alone. The fact that PVP alone has no clarifying power indicates a definite synergistic effect between PVP and PEI. It should be further noted that since the blends and PEI alone were compared on an equivalent *total weight* basis, the amount of PEI in the blend is ⅓ to 1/5 that of the PEI as the sole flocculant. That is, a given amount of PEI blended with PVP (which in itself is not a flocculant) will give a clarification equivalent or superior to many times that amount of PEI used without PVP.

EXAMPLE II

A 5% dispersion of 325 mesh amorphous silica was treated with various ratios of PVP to PEI. In all cases, the amount of PEI was kept constant at 2 ppm. Sedimentation rate in feet per minute was determined. As controls, similar runs were made using only PEI and only PVP. Results are presented graphically in the accompanying drawing.

By reference to the drawing and an inspection of the graph, it will be noted that (1) PVP alone is not a flocculant for silica, (2) PEI alone is a flocculant for silica; however, the rate of flocculation is an inverse function of flocculant level, and (3) combinations of PVP and PEI produce a sedimentation rate higher than that of the PEI constituent of the blend and much higher than that obtained with a level of PEI equal to that of the total blend.

EXAMPLE III

Two hundred ml. of raw sewage were measured out into a 250 ml. beaker. The desired amount of flocculant was added as a 0.05% solution. The mixture was agitated for 1 minute. Quality of flocculation was noted as being good using 50 ppm. of 3/1 PVP K-90/PEI wherein the PEI has an average molecular weight of 40–60,000.

The flocculating compositions of the present invention are excellent flocculants for taconite tailings. Taconite ore is composed of approximately 25% magnetite $Fe_3O_4$ with the remainder being quartz. The taconite ore is converted into a concentrate suitable for charging directly into a steel furnace. Basically the concentration of taconite ore consists of blasting the hard ore rock, crushing it to suitable size and hauling it to the treating plant. The rock is charged with water to rod and ball mills and ground to 325 + mesh size to form a slurry. The slurry is passed through a series of magnetic separators called cobbers, roughers, cleaners and finishers. Additional water is added at each step, since each additional step requires a thinner slurry. The tailings, i.e., those particles in the slurry containing less than 5 percent magnetite, are drained off from each separation and sent to the flocculation tanks for water recovery.

EXAMPLE IV

In segments of the mining industry clarity of effluent, while important, is less important than the rate of settling and the degree of final compacting of the sediment. Here the process may be defined as a period of initial settling followed by a period of compacting. A quantity of liquid tailing at 5% solids from the taconite iron ore enrichment process were made available for testing.

Three and one-half ppm. of flocculant on solids were added in three equal aliquots to 500 ml. of the taconite tailings in a graduated cylinder. The slurry was agitated by 10 up-down strokes of a 2½ inch diameter perforated plunger. The rate and type of settling was noted as shown in the following Table. Three to one ratios of PVP to PEI were used for all mixtures.

Table 2

| Molecular Weight PVP | PVP K-value | PEI Molecular Weight Range | Approx. Time (Minutes) from End of Agitation to Start of Compacting Period | Ml. Sediment After 60 Minutes |
|---|---|---|---|---|
| — | — | — | 30 | 40 |
| 360,000 | K-90 | — | 5 | 38 |
| 10,000 | K-15 | 50–100,000[1] | 5 | 36 |
| 10,000 | K-15 | 40– 60,000[2] | 20 | 30 |
| 40,000 | K-30 | 50–100,000 | 5 | 43 |
| 40,000 | K-30 | 40– 60,000 | 10 | 37 |
| 160,000 | K-60 | 50–100,000 | 5 | 40 |
| 160,000 | K-60 | 40– 60,000 | 5 | 40 |
| 360,000 | K-90 | 50–100,000 | 1 | 35 |
| 360,000 | K-90 | 40– 60,000 | 1 | 35 |
| — | — | 50–100,000[3] | 5 | 38 |
| — | — | 50–100,000[4] | 5 | 37 |

[1] Montrek 1000 - Dow Chem. Corp.
[2] Montrek 600 - Dow Chem. Corp.
[3] 1 ppm. on tailings solids
[4] 3 ppm. on tailings solids

EXAMPLE V

The borax refining process entails a period of hot extraction of ore followed by sedimentation of insolubles and crystallization of borax from supernatant liquid. Here the same criteria of maximum rate and compacting occur to an even larger degree.

Twenty-five ppm. of three to one ratio of flocculant on insolubles were added to 350 ml. of 5% borax ore slurried in a hot 45% borax aqueous solution. PEI and PVP were each employed alone and compared with a control (no flocculant). Following vigorous agitation, degree and rate of flocculation were noted. The results obtained are shown in the following table.

Table 3

| Flocculant | Ml. of Sediment After 30 Min. | 120 Min. | Clarity After 120 Minutes |
|---|---|---|---|
| 3/1 PVP K-90/PEI (1) | 50 | 40 | sl. haze |
| PEI[1] | 68 | 62 | sl. haze |
| PVP K-90 | 65 | 60 | sl. mod. haze |
| Control (no flocculant) | 110 | 97 | very cloudy |

[1] Montrek 600; 40–60,000 MW - Dow Chemical

It will be obvious to those skilled in the art that the flocculated or coagulated materials obtained by the process of the present invention may be readily separated from the aqueous liquid by conventional means, such as filtration, siphoning of the clear supernatant liquid and the like.

BRIEF DESCRIPTION OF THE DRAWINGS

The above description included reference to the accompanying single FIGURE drawing presenting graphically the results of the flocculation tests as set forth in Example II.

What is claimed is:

1. A process for flocculating inorganic solids dispersed in an aqueous phase comprising adding a flocculating amount of a flocculating composition to said aqueous phase, said flocculating composition consisting essentially of a blend of from about 2 to about 3 parts by weight of polyvinyl pyrrolidone having a K-value of from about 80 to about 140, said K-value being determined on the basis of the viscosity of a 1% solution of said polymer in water at 25 ± 0.05°C, and about 1 part by weight of polyethylene imine having a viscosity, measured in a 5% aqueous solution at 25°C, of from about 20 to about 5,000 centipoises.

2. The process of claim 1 in which said flocculating composition added to the aqueous phase comprises an aqueous solution of said blend of polyvinyl pyrrolidone and polyethylene imine.

3. The process of claim 1 in which the polyethylene imine in said blend added to the aqueous phase has a viscosity of about 28 centipoises.

4. The process of claim 1 in which the polyethylene imine in said blend added to the aqueous phase has a viscosity of about 1,200 centipoises.

5. The process of claim 1 in which the flocculating composition consists essentially of about 3 parts by weight of polyvinyl pyrrolidone and about 1 part by weight of polyethylene imine.

* * * * *